J. E. McWILLIAMS.
WHEEL.
APPLICATION FILED FEB. 19, 1912.
1,035,625.
Patented Aug. 13, 1912.
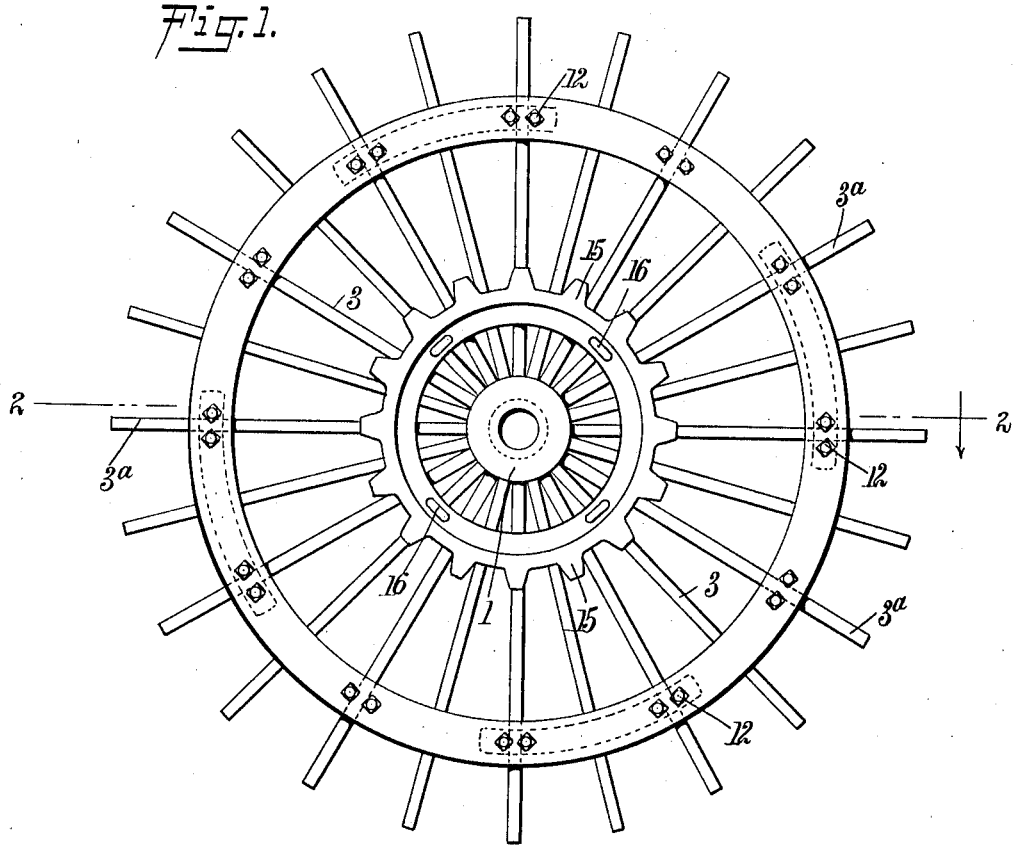
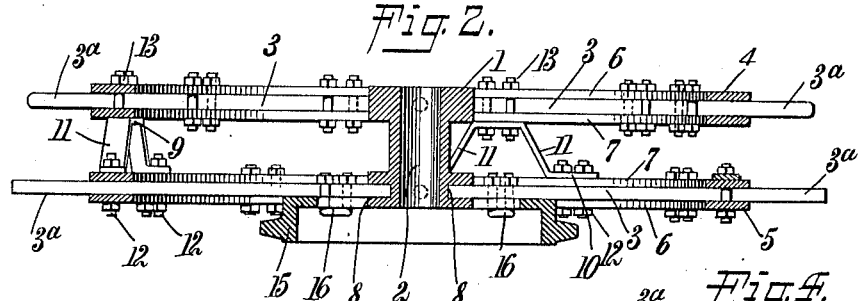
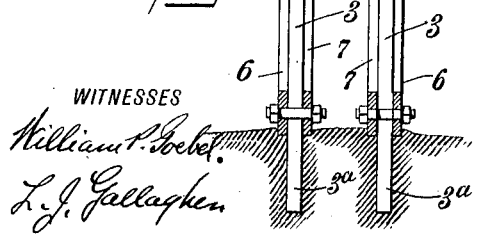
WITNESSES
William P. Goebel
L. J. Gallagher
INVENTOR
Joseph E. McWilliams
BY Munn & Co
ATTORNEYS

UNITED STATES PATENT OFFICE.

JOSEPH E. McWILLIAMS, OF HITCHCOCK, OKLAHOMA.

WHEEL.

1,035,625.  Specification of Letters Patent.  Patented Aug. 13, 1912.

Application filed February 19, 1912. Serial No. 678,494.

*To all whom it may concern:*

Be it known that I, JOSEPH E. McWILLIAMS, a citizen of the United States, and a resident of Hitchcock, in the county of Blaine and State of Oklahoma, have invented a new and Improved Wheel, of which the following is a full, clear, and exact description.

My invention relates generally to wheels, and more particularly comprehends a traction wheel, especially intended for use on farm implements.

The principal object of my invention is to provide a traction wheel especially adapted for use on farm implements, the wheel comprising a number of staggered spokes adapted for engagement with the ground whereby the implement may be drawn thereover.

A further object of my invention is to provide a new and improved traction wheel for use on farm implements whereby the disadvantages following the use of a rim wheel are overcome; the wheel set forth in this application involves a number of radiating and staggered spokes adapted for engagement with the ground, thereby avoiding the packing of the ground after being furrowed by using implements having flat rim wheels.

Other objects and advantages of the invention will appear as the description thereof proceeds, all of which is particularly pointed out and included in the appended claims.

Reference is to be had to the accompanying drawings, constituting a part of this specification, in which similar characters of reference denote corresponding parts in all the views and in which—

Figure 1 is a side view of the wheel; Fig. 2 is a sectional view thereof on the line 2—2 of Fig. 1; Fig. 3 is a detail view showing the engagement of the outer ends of the spokes in the ground; and Fig. 4 is a detail plan view of the spokes together with the rings for holding and positioning the spokes, the brace which extends between the rings being also shown.

A suitable hub 1, having an opening 2 extending therethrough, whereby the hub may be positioned on an axle, is provided with a number of radiating spokes 3, which are staggered with respect to each other, alternate spokes being positioned between the sides of the ring 4, other spokes being engaged between the sides of the ring 5, whereby one set of spokes is offset with respect to the other set. Each ring preferably comprises the two parts 6—7, the spokes being positioned between the two parts and the inner ends of the spokes are engaged by the hub in any suitable manner, preferably by being inserted in recesses 8 carried thereby.

The spokes are properly positioned between the sides of the rings and the rings are properly spaced apart by means of a brace made up of the intermediate portion 9 engaging the inside of one part 7 of one of the rings, together with the end portions 10 which engage the inside of one part of the other ring, the connecting angularly extending parts 11 being of such length that the distance between the rings is properly maintained. The ends 10 of the brace are secured to the parts 6—7 of one ring by any suitable means, such as bolts and nuts 12, the spokes 3 carried by this ring passing outwardly between the bolts 12 in engagement with each end portion of the brace, while each spoke 3 carried by the other ring passes between the bolts and nuts 13 which engage the intermediate portion 9 of the brace, and secure it in position to that ring.

In order that suitable motive power be transmitted to the wheel any suitable device may be attached thereto, adapted to serve this purpose, the preferred form being a sprocket wheel 15 having suitable teeth thereon, the wheel being secured to some of the spokes 3 at suitable points by any desirable fastening means, such as hooks 16, the ends of which engage opposite sides of the spokes, to which the sprocket is secured.

Referring particularly to Figs. 1 and 3, it will be noted that the rings are remote from the ends of the spokes 3, the rings being merely used to properly position and space the spokes, the rings performing no other function, the inventive idea being to permit the outer ends 3ª of the spokes to engage the ground and enter therein as the wheel is drawn over the ground, thereby doing away with the close packing of the earth during farming operations when a rim wheel is used.

The production of such a wheel provides for a secure gripping of the earth whereby no slipping occurs, and at the same time, prevents packing of the furrows which is a decided disadvantage inasmuch as time and labor has already been involved in providing these furrows; the outer ends of the spokes have a tendency to disintegrate the ground at the points where they leave it, thereby overcoming the disadvantage of running an ordinary wheel over plowed ground.

The size of the wheel, and the shape of the different parts which enter into its construction, along with the material which go to make up these parts, may be variously changed in order to adapt the wheel to different implements, such changes being comprehended within the spirit and scope of my invention.

Having thus described my invention, I claim as new and desire to secure by Letters Patent:

1. A traction wheel comprising a hub, a plurality of spokes adjacent each end of the hub, the spokes at one end of the hub being positioned between the spokes at the other end of the hub, a ring engaging the spokes extending from one end of the hub, the ring being made up of parts positioned on opposite sides of the spokes, a ring engaging the spokes extending from the other end of the hub, this ring being made up of parts engaging opposite sides of the spokes, together with means extending between the inner parts of the rings in order to properly space them, and means engaging the spacing means, the spokes and also the rings whereby the parts are held together.

2. A traction wheel comprising a hub having a number of spokes at each end thereof, the spokes at one end being positioned between the spokes at the other end, the spokes at one end being engaged and spaced by a plurality of parts which engage opposite sides of the spokes, the spokes at the other end of the hub being engaged and spaced by a plurality of parts engaging the opposite sides of the spokes, together with braces extending between the inner parts in order to space them, and a plurality of fastening means engaging the braces and extending on opposite sides of the spokes, whereby the parts are securely held together.

3. A traction wheel comprising a hub, a number of spokes at each end of the hub, the spokes at one end being positioned between the spokes at the other end, a plurality of oppositely positioned rings engaging the spokes for spacing them, the said rings being between the ends of the spokes, braces extending between the sets of spokes and in engagement with the said rings, together with fastening devices engaging the braces and the rings, whereby the parts of the wheel are held together.

4. A traction wheel comprising a hub having a number of spokes at each end thereof, the spokes at one end being engaged and spaced by a plurality of parts which engage opposite sides of the spokes, the spokes at the other end of the hub being also engaged and spaced by a plurality of parts, a plurality of braces extending between the inner parts in order to space them, together with a plurality of fastening devices carried by each brace and at different portions thereof, the said fastening devices passing through the said parts and on opposite sides of the spokes, whereby the said parts and spokes and braces are held together to form a rigid structure.

In testimony whereof I have signed my name to this specification in the presence of two subscribing witnesses.

JOSEPH E. McWILLIAMS.

Witnesses:
 LEVI BAKER,
 J. B. SCOTT.

Copies of this patent may be obtained for five cents each, by addressing the "Commissioner of Patents, Washington, D. C."